April 28, 1936.     A. R. LUKENS     2,039,096
METHOD OF MOLDING BATTERY CONTAINERS AND SIMILAR OPEN TOP RECEPTACLES
Filed Aug. 5, 1933
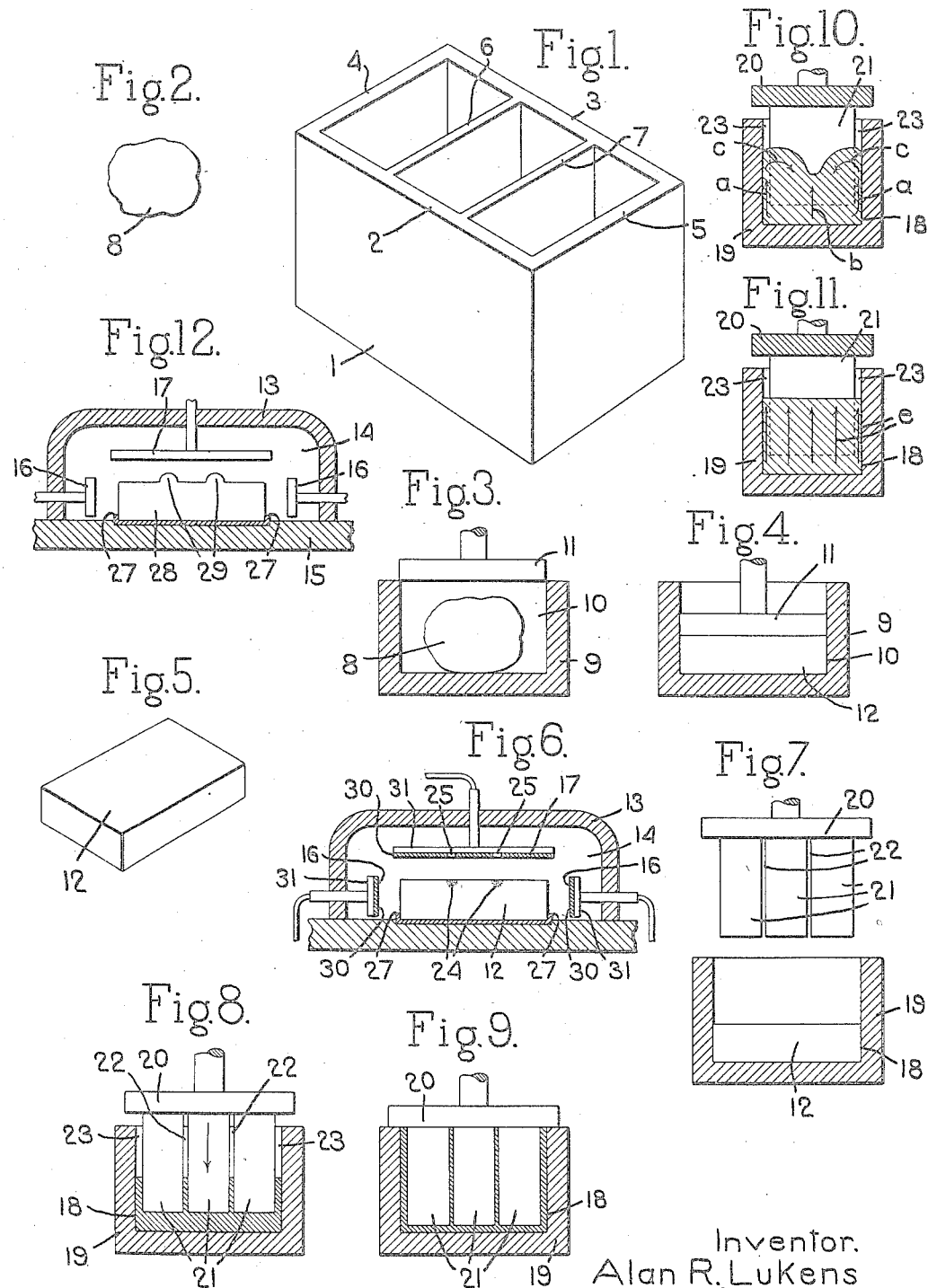
Inventor.
Alan R. Lukens
by Heard Smith & Tennant.
Attys.

Patented Apr. 28, 1936

2,039,096

UNITED STATES PATENT OFFICE 2,039,096

METHOD OF MOLDING BATTERY CONTAINERS AND SIMILAR OPEN TOP RECEPTACLES

Alan R. Lukens, Belmont, Mass.

Application August 5, 1933, Serial No. 683,801

2 Claims. (Cl. 18—55)

This invention relates to a method of molding from thermoplastic material battery containers and similar receptacles which are open at the top, and it has for its object to provide an improved method of molding battery containers and the like from thermoplastic material by which so-called "flow lines" will be eliminated from the side walls or partitions of the container or receptacle, or at least will be directed into portions of such thick cross-section that they are harmless.

Battery containers and similar open top receptacles are now commonly molded from thermoplastic material such as a mixture of bitumen, a fibrous material, a filler and sometimes other ingredients.

The filler and fibrous material are usually mixed with melted bitumen in a heat-jacketed mixing apparatus till there is formed a more or less homogeneous, dough-like mass, the plastic consistency of which is maintained by subjecting the thermoplastic material in the mixer to a temperature between 250° F.–350° F. It is the custom for the operative to reach into the mixer and tear loose a lump of dough sufficient to approximately form the intended finished article and to place this lump on scales. The lump is brought to the correct weight for forming the finished article by adding to it or pulling off the excess. When the lump has the proper weight the operative molds it with his hands into a roughly-shaped ball, frequently referred to as a "biscuit". The operative must perform the above operations quickly, not only to minimize the heat losses but also to protect his hands which are only shielded from these high temperatures by gloves. Naturally these high temperatures require speed of handling and as a result the individual lumps or biscuits are of various contours, more or less spherical in shape.

Sometimes each biscuit is subjected to the action of heat, preferably by placing it in a heating chamber, for the purpose of softening any semi-crust which may have formed on it and increasing the plasticity thereof, and after the biscuit has been heated it is molded into the shape of the battery container or other receptacle by means of a molding apparatus which comprises a mold cavity into which the lump or biscuit of hot thermoplastic material is received and a molding element in the form of a plunger and having a shape corresponding to the interior of the battery container or receptacle, which molding element is forced into the mold cavity thereby to cause the thermoplastic mass to flow into the spaces between the walls of the mold cavity and said plunger. Where the thermoplastic material is deposited in the mold cavity in the form of a ball or lump the pressure of the plunger against the mass first causes it to flow outwardly over the bottom of the mold cavity and then upwardly along the walls thereof. During this molding operation, however, the thermoplastic material will flow most readily into the spaces of larger cross-sectional area, which spaces will first be filled, and as the molding pressure continues the thermoplastic material will be forced from the spaces of larger cross-sectional area into the spaces having the smaller or lesser cross-sectional areas.

Battery containers are commonly divided by partitions into a plurality of compartments and the partitions are frequently thinner than the side walls. As a result when the lump or mass of thermoplastic material is subjected to the pressure by the molding elements said material will usually tend to flow first into the side wall cavities of the mold and from the latter into the partition cavities. The flow into the partition cavities is thus partly in a transverse direction from each of the two opposed side wall cavities and as the material flows into any partition cavity from each side the two flowing masses meet at some point in the partition and the line along which they meet is referred to as the "flow line".

The character of the thermoplastic material used in making battery containers is such that when two flowing masses meet they do not knit together perfectly at the line of junction with the result that a line of weakness is apt to exist along said line. Such flow lines often are found in the walls of the battery container or other receptacle as well as in the partitions. This occurs where the lump of thermoplastic material is unevenly heated before it is subjected to the molding operation. The plasticity of the material depends upon its temperature and if the lump or "biscuit" of thermoplastic material is non-uniformly heated so that some portions are hotter than other portions the hotter portions will flow more freely into the wall cavities of the mold than the other portions of the material. Under these conditions the thermoplastic material will rise in the wall cavities unevenly and may flow freely into one wall cavity and when the latter is full be forced laterally around into an adjoining wall cavity. This uneven flow of the material into the wall cavities is very apt to produce the flow lines above referred to.

The presence of the flow lines in the walls or partitions frequently results in leaks thus rendering the battery container unfit for use. These flow lines are always lines of weakness and they are sometimes of such a character that the battery container will break along the flow lines during assemblage or assembly charging.

In an effort to reduce the formation of flow lines it has been proposed to heat certain portions of the biscuit more than others so as to develop differential plasticity in the biscuit in such a way as to promote flow into the more restricted cross-sectional areas of the mold during the molding operation.

The results of these efforts were very unreliable because of the difficulty of correctly super-heating the desired portions of the irregularly shaped biscuit. The heating is done by placing the biscuit in a heating chamber within which are electrically heated plates. Because of the irregular shape of each biscuit the portions to be super-heated may be situated too far from the heating plates to obtain the proper heat, or they may be too near the plates and thus be subjected to a frying or charring action, or some portion of the biscuit which it is desired not to super-heat may be so near the heating plates as to be overheated and thus rendered unduly plastic. Any of these conditions causes irregular flow of the thermoplastic material in the mold which tends to produce the objectional flow lines.

I have discovered that flow lines may be practically eliminated by treating each biscuit so as to invariably super-heat certain predetermined portions thereof before performing the molding operations.

In carrying out my invention I take the quantity of thermoplastic material necessary to make each container and pre-form it into a biscuit of a predetermined shape, preferably one which will just fill the bottom of the mold cavity. This biscuit is then subjected to the action of heat, the heat being applied to different predetermined portions of the biscuit in different regulated amounts. This differential heating of the biscuit is accomplished in such a way that when the biscuit is placed in the mold cavity the hotter and therefore more plastic portions are those which naturally flow into the mold spaces of lesser cross-sectional area while the cooler portions of the biscuit are those which naturally flow into the molding spaces of larger cross-sectional area. Where the heating of the pre-formed biscuit is performed in this way then during the molding operation the hotter portions of the biscuit which have the greatest plasticity flow readily into the mold spaces of smaller cross-sectional area so that during the molding operation such spaces of smaller cross-sectional area will be filled approximately uniformly with the spaces of larger cross-sectional area. In other words, according to this new method the thermoplastic material may be made to rise uniformly in the mold spaces of larger and smaller cross-sectional area so that there will be no cross or horizontal flow which results in the formation of the flow lines.

In order to give an understanding of the invention I have illustrated in the drawing more or less diagrammatically one way in which the invention may be practised although it will be obvious that the practice of the method is not limited to the particular steps herein illustrated.

In the drawing, Fig. 1 is a perspective view of a battery container which has been made in accordance with my invention;

Fig. 2 illustrates a mass of thermoplastic material from which the battery container is to be made, said mass being in the form of a lump of irregular shape;

Figs. 3 and 4 show the steps of preforming the mass of thermoplastic material into a biscuit of a predetermined shape;

Fig. 5 is a perspective view of the preformed biscuit;

Fig. 6 is a diagrammatic view illustrating the manner of supplying heat to the biscuit in regulated and controlled amounts;

Fig. 7 illustrates the preformed biscuit in the mold cavity ready to be molded;

Figs. 8 and 9 illustrate the steps of molding the preformed biscuit into a battery container;

Fig. 10 shows the way flow lines are formed;

Fig. 11 illustrates the operation of my improved method;

Fig. 12 is a view showing a modification of the invention.

While for convenience the invention is herein described as it would be used in making a battery container such as shown in Fig. 1 yet it will be understood that the invention is equally applicable for molding any receptacle having an open top and is, therefore, not limited to the manufacture of any particular kind of receptacle.

The battery container is indicated at 1 and as illustrated in Fig. 1 it is formed with the two side walls 2 and 3, the end walls 4 and 5 and the partitions 6 and 7 which connect the side walls 2 and 3 thus making a battery container with three compartments. Since this battery container is molded from a mass of thermoplastic material the side walls and partitions will be integral with each other.

In making the battery container the first step is to provide a mass 8 of hot thermoplastic material which is just sufficient to make the battery container or other desired article. This is usually done by providing a lump or mass of a predetermined weight. This mass is then usually rolled roughly into the form of a lump or ball as indicated in Fig. 2, this being done while the thermoplastic material is still hot.

The next step in my improved process is to preform the mass 8 into a so-called "biscuit" of a predetermined shape. This preforming operation may conveniently be done in a mold or press such as shown in Figs. 3 or 4 which comprises a female mold element 9 having a mold cavity 10 and a male mold member in the form of a plunger 11 adapted to be depressed into the mold cavity. The mass 8 of material is placed in the mold cavity 10 and the plunger is depressed thereby shaping the mass 8 into a so-called "biscuit" 12 which has a shape defined by the mold cavity 10. As herein shown this biscuit is brick shaped and it has the same transverse dimensions as the battery container to be molded.

This brick-shaped biscuit 12 is then subjected to the action of heat which is applied to different portions thereof in different regulated quantities, partly to soften any semi-crust which may have formed on the biscuit due to surface cooling while it is being formed and partly to put the biscuit into such shape that when it is finally molded into the form of the battery container the molding operation may be accomplished either without the formation of the flow lines or in such a way that any flow lines which do occur are transferred to portions of the container of large cross-section where they are harmless.

While any approved way of heating the biscuit 12 may be employed I have herein illustrated a heating device in the form of a dome-shaped element 13 which provides within it a heating chamber 14 to receive the biscuit. In the construction shown the biscuit is supported on a table 15 and dome member 13 is placed over the biscuit thereby forming the heating chamber 14. This dome member 13 may be made so that it can be conveniently raised from the table 15 to permit the biscuit to be placed thereon or removed therefrom. This dome element 13 is provided with regulatable heating elements which serve to heat the biscuit, and which are properly placed and regulated to give the desired heating effect.

As herein shown there are two heating elements 16 situated at opposite ends of the biscuit 12 and a heating element 17 above the biscuit for heating the top surface thereof. There will also be other heating elements (not shown) for heating the other two sides of the biscuit if desired. These heating elements may conveniently be electric heating elements in the form of plates 30 backed by heating coils 31 and they may be controlled by any suitable rheostats. If desired they may be adjustably mounted in the dome member 13 so that they can be adjusted nearer to or further from the biscuit, depending upon the manner in which it is desired to heat the biscuit.

When the biscuit has been properly heated by subjecting certain prescribed portions thereof to predetermined plasticity-promoting temperatures as hereinafter described it is removed from the chamber 14 and placed in the mold cavity 18 of a molding element 19 as shown in Fig. 7 and said biscuit is then molded into the final form of the battery container or other receptacle by means of a plunger molding element 20 which is forced into the mold cavity 18. If the battery container or other article which is to be formed is one with three compartments and two partitions as shown in Fig. 1 then the ram or molding element 20 will be formed with the three plungers 21, each having the size of one of the compartments of the completed article, said portions 21 being separated by spaces 22 which form the partition cavities of the mold.

The mold element 20 is smaller in size than the mold cavity 18 so that when the mold element is depressed into the mold cavity as shown in Figs. 8 and 9 there will exist a space 23 between the exterior of the members 21 and the walls of the mold cavity, which space 23 forms the cavities in which the walls of the completed receptacle are molded.

When the plunger element is forced into the mold cavity as shown in Fig. 8 the pressure of the portions 21 thereof against the thermoplastic material causes the latter to flow upwardly into the wall cavities 23 and partition cavities 22. Normally this thermoplastic material will flow most freely into the spaces of larger cross-sectional area so that if the biscuit is evenly heated throughout and all parts thereof have the same plasticity the natural result would be that the material of the biscuit would flow first into the widest wall cavities and after they were filled it would flow laterally from the wall cavities 23 into the more constricted partition cavities 22. This lateral flow from the wall cavities into the partition cavities is what causes the undesirable flow lines.

In Fig. 10 I have illustrated somewhat diagrammatically the way these flow lines form in the partition of a battery container when the biscuit is improperly heated. As the plunger 20 is forced into the mold cavity 18 the thermoplastic material flows up the side wall cavities as indicated by the arrows a, and while there is a certain upward flow into the narrower partition cavities 22 from the bottom as shown by arrow b yet the upward flow in the larger side wall cavities 23 is much faster than in the partition cavities so that there will develop a lateral flow from the opposed side wall cavities 23 into the partition cavities 22 as shown by the arrows c. The line where these lateral flowing masses meet constitutes the objectionable flow line.

In heating the biscuit in accordance with my method I propose to so apply the heat that the portions of the biscuit material which flow into the more restricted mold cavities is hotter and, therefore, has a greater plasticity than the material which is forced into the wider and larger mold cavities. For instance, in making the battery container shown in the drawing wherein the partitions 6 and 7 are thinner than the side walls I propose to so heat the biscuit 12 that the portions 24 of the biscuit indicated by the shaded portion Fig. 6 which would naturally flow up into the partition cavities will be hotter and, therefore, have a greater plasticity than other portions of the biscuit. This may be accomplished by making the top heating plate 30 with slots 25 over the portions 24 of the biscuit so that there will be a direct radiation from the heating coil 31 through said slots. In this way these portions 24 of the biscuit will become hotter and thus more fluid than the other portions of the biscuit.

When the heated biscuit is placed in the mold cavity 18 and is subjected to the action of the plunger element 21 the more plastic portions 25 which are located below the partition cavities 22 flow readily into said restricted partition cavities so that the flow of the material into these cavities will be as rapid as the flow into the larger or wider wall cavities 23. By properly adjusting the heat, the temperature and consequently the plasticity of the different portions of the biscuit may be so arranged that when the plunger element of the mold is forced into the mold cavity the thermoplastic material will rise evenly in all of the spaces of the mold.

This is illustrated in Figs. 8 and 11. In Fig. 8 the thermoplastic material is shown as rising evenly in both the wall cavities of larger cross-section and the partition cavities of lesser cross-section, and in Fig. 11 the arrows e indicate the direction of flow in forming either the partitions or walls of the container in accordance with my invention which produces a uniform upward movement of the plastic material in both the wall cavities and partition cavities, which upward movement is without appreciable lateral flow such as results in the formation of undesirable flow lines.

The pre-formed biscuit 12 which is described above is one which has the same cross sectional area as the mold cavity 18. Where a biscuit of this shape is used, the entire flow of the thermoplastic material will be upwardly in the mold cavities and, as stated above, by subjecting certain predetermined portions of the biscuit to predetermined plasticity-promoting temperatures, it is possible to secure an even upward flow of the plastic material in the mold cavities which will eliminate the formation of the flow lines.

It is not essential, however, that the biscuit should have the same cross sectional area as the mold cavity for benefits of my improvements may be secured even if the biscuit is pre-formed into a shape somewhat different from that of the mold cavity. Under these conditions, the first pressure of the molding element against the biscuit would be to cause a lateral flow over the bottom of the mold cavity at those places where the pre-formed biscuit does not conform to the shape of the mold cavity and then to cause the upward flow in the portions of the mold cavity which form the walls of the container. The essential feature of the invention relates to pre-forming the biscuit into one of a predetermined shape and then subjecting predetermined portions of this pre-formed biscuit to predetermined or exact plasticity-promoting temperatures which are so coordinated with the cross sectional areas of the mold cavity that during the molding operation there will be a controlled upward flow of the plastic material.

In making some types of battery containers, the best results are secured by so controlling the upward flow as to cause the thermoplastic material in each side wall cavity to flow upwardly and outwardly slightly toward the corners. This can be done by so controlling the heating of the pre-formed biscuit that the center portion of the biscuit is more highly heated than other portions. This manner of controlling the flow is especially advantageous in the making of battery containers that are molded with thick, heavy pilasters at the corners. Any flow lines which may be developed by this tree-like flow will be buried in the heavy sections of the battery container where they are harmless.

In Fig. 12 I have illustrated a different way of securing the desired result. In this embodiment the biscuit, which is indicated at 28, is pre-formed with projecting portions 29 on its upper surface which are located at those portions of the biscuit which naturally flow into the mold spaces of smaller cross sectional area such, for instance, as the partition cavities. Where a biscuit is thus formed, these projecting portions 29, being nearer the heating element 17, are more highly heated and are thus rendered more plastic than the other portions of the biscuit. When a biscuit of this shape is placed in the mold and subjected to the molding pressure, these more highly heated portions 29, which by reason of their higher temperature are more plastic, flow readily into the smaller partition cavities 22 so that the wall and partition cavities will be filled substantially uniformly and without the development of any cross or lateral flow.

While I have illustrated herein some ways in which the invention may be practised, yet the invention is not limited to the manufacture of any particular article nor to the preforming of the biscuit to any particular shape. The invention rather pertains to the process which includes making each biscuit invariably of some exact, predetermined shape and then subjecting the biscuit to a plasticity-promoting temperature in such a way that those portions of the biscuit which flow into the mold spaces of lesser cross sectional area are more highly heated and consequently have greater plasticity than the portions which flow into mold spaces of greater cross sectional area.

I claim:

1. The method of molding articles from hot thermoplastic material comprising roughly shaping a mass of hot thermoplastic material into a general ball shape, subjecting said ball-shaped mass to a preliminary molding operation by means of male and female mold members thereby to form a biscuit having the same transverse dimension as the battery container to be molded, subjecting different portions of the accurately-shaped biscuit to different degrees of heat, whereby certain portions of the biscuit are superheated, and then molding the exactly-shaped biscuit into an article of the desired shape and in so doing forcing the superheated portions of the biscuit into the most restricted portions of the mold cavity.

2. The method of molding battery containers and the like from hot thermoplastic material which consists in roughly shaping a mass of hot thermoplastic material in the general shape of a ball, subjecting said ball-shaped mass to the action of co-operating mold members to mold the ball into a biscuit having an exact predetermined shape which fits accurately the mold cavity in which the battery container is to be molded, subjecting the biscuit to the action of heat and in so doing superheating certain portions of the biscuit, placing the heated exactly-shaped biscuit in said mold cavity and molding it into the shape of a battery container, during which operation the superheated portions of the biscuit are forced into the portions of the mold cavity, which mold the partitions of the battery container.

ALAN R. LUKENS.